United States Patent [19]

Ishikawa

[11] Patent Number: 5,405,220

[45] Date of Patent: Apr. 11, 1995

[54] OIL FEEDING COLLET CHUCK AND ITS COLLET

[75] Inventor: Hitoshi Ishikawa, Takahama, Japan

[73] Assignee: NT Tool Kabushikikaisha, Japan

[21] Appl. No.: 160,719

[22] Filed: Dec. 2, 1993

[30] Foreign Application Priority Data

Mar. 30, 1993 [JP] Japan ................... 5-095543

[51] Int. Cl.$^6$ .................. B23B 31/20; B23B 51/06; B23C 5/28
[52] U.S. Cl. ......................... 408/56; 279/20; 279/46.4; 408/61; 409/136
[58] Field of Search ............... 279/20, 46.1, 46.2, 279/46.4, 47–59, 157; 408/56, 57, 59–61; 409/136

[56] References Cited

U.S. PATENT DOCUMENTS

| 4,640,652 | 2/1987 | Rivere, Jr. | 408/59 |
| 4,705,439 | 11/1987 | Hoyle et al. | 409/136 |
| 4,817,972 | 4/1989 | Kubo | 279/48 |
| 4,955,764 | 9/1990 | Reinauer | 408/57 |
| 5,028,178 | 7/1991 | Ronen | 279/20 |

FOREIGN PATENT DOCUMENTS

| 2239849 | 2/1975 | France | 408/56 |
| 3617540 | 11/1987 | Germany | 408/56 |
| 61-205709 | 12/1986 | Japan . | |

Primary Examiner—Steven C. Bishop
Attorney, Agent, or Firm—William A. Drucker

[57] ABSTRACT

An annular front end base portion, a main portion and an annular rear end base portion form all together a substantial portion of a collet provided with a tapered outside surface adaptable closely in a tapered hole of a collet chuck and a tool holding hole is formed in the axial portion of the collet. In the main portion are formed a first set of axially long radial slits opening at the end surface of the front end base portion and terminating to be closing in the rear end base portion and a second set of axially long radial silts opening at the end surface of the rear end base portion and terminating to be closing in the front base portion. Each of the radial slits of the first set and each of the radial slits of the second set are arranged at proper angular intervals and alternately along the peripheral direction of the collet, and respective zigzag paths are formed which are closed over the whole peripheries of the outside and inside surfaces of the collet, respectively. The outside and inside surfaces of the collet contact closely the inside surface of the tapered hole and the outside surface of a tool fitted in the tool holding hole, respectively along the respective zigzag paths. The collet is able to contract radially owing to the radial slits of the two sets and the cutting oil supplied to the collet flows out of the collet outwards only through jets provided for feeding oil.

10 Claims, 5 Drawing Sheets

OIL FEEDING COLLET CHUCK AND ITS COLLET

BACKGROUND OF THE INVENTION

1. Field of the Invention

This invention relates to a collet chuck and a collet used therein and more particularly to an oil feeding collet chuck wherein cutting oil is supplied to a tool fitted in a collet chuck from an oil passage in a main body of the chuck and to a collet for the chuck.

2. Description of the Prior Art

A main body 1c of a conventional collet chuck Ac comprises a tapered hole 2c, at one end thereof, to put a collet 9c therein and an inside oil passage 4c communicating with the tapered hole 2c, as shown in FIG. 7. The outside surface of the collet 9c is made in a tapered form to fit closely in the tapered hole 2c. The collet 9c includes a groove 17c at the front end portion (the large radius side) of the outside surface thereof, a fitting flange 18c contiguous to the groove 17c and a tool holding hole 13c formed in the axial portion thereof. A plurality of axially long radial slits 14c are formed in the collet 9c at circumferential suitable intervals and terminate in an annular base portion 12c at the rear end portion (the small radius side) of the collet 9c and a loose hole 34 is formed in this base portion 12c. All the radial slits 14c are open at the front end of the collet 9c and communicate with the loose hole 34 and the tool holding hole 13c. The axially long radial slits 14c make possible the radial constriction of the collet 9c. The collet chuck Ac is provided with a clamp member 20c to press the collet 9c into the tapered hole 2c. Cutting oil is supplied to a tool 28c fitted in the tool holding hole 13c from the oil passage 4c through the loose hole 34 and the radial slits 14c.

When the cutting oil is supplied at a constant flow rate, the axial speed of the cutting oil flowing out of the front end of the collet 9c is inversely proportional to the sum of those cross-sectional areas of all the radial slits 14c which are perpendicular to the axis of the collet 9c at the front end of it. This sum is considerably large for the radial slits 14c provided for the purpose of constricting the collet radially. Accordingly, the axial speed of the cutting oil is rather small and the cutting oil can not be sufficiently supplied to a tip 29c of the tool 28c where the cutting oil is most required. When the chuck Ac is rotated at a high speed, the cutting oil subject to the centrifugal force due to rotation will flow radially out of the front end of the collet 9c as well and the supply of the cutting oil to the tool 28c is the more insufficient. Furthermore, the cutting oil together with scrap and dust metals contained therein enters the grooves for balls 25c formed in a main body 21c of a clamp member 20c and the main body 21c sometimes is unable to rotate.

In another conventional collet chuck Ad shown in FIG. 8, an oil duct 32d is formed, along the axis of a tool 28d, from a tip 29d of the tool 28d to the rear end of it. In all the figures of the present specification, same reference numerals represent same or equivalent members and accompanying alphabets a through d are used in order to discriminate different examples and embodiments. The oil duct 32d communicates directly with an oil passage 4d at the rear end of the tool 28d and a gum seal 35 prevents the cutting oil from leaking towards radial slits 14d. In this collet chuck, the cutting oil is supplied sufficiently to the chip 29d of the tool 28d through the oil duct 32d.

However, when the chuck is used for a long time and the gum seal is damaged, the cutting oil begins to leak to the radial slits and the cutting oil again is insufficiently supplied.

SUMMARY OF THE INVENTION

An object of the present invention is to provide an oil feeding collet chuck wherein axially long radial slits are formed in a collet in order to constrict the collet radially. Cutting oil does not flow directly outwards from the radial slits but flows out from different jets having a suitable cross-sectional area with a sufficient axial speed and to provide the collet for the chuck.

According to the present invention, a first set of axially long radial slits which are open at the end surface of an annular front end base portion in a collet provided with a tapered outside surface and terminate to close in an annular rear end base portion, and a second set of axially long radial slits which are open at the end surface of the rear end base portion and terminate to be close in the front end base portion, are provided at suitable alternating circumferential intervals. Narrow jets are formed in the front end base portion and are opening at the end surface of the base portion and communicates with an oil passage through the radial slits of the second set or a passage provided additionally. Cutting oil supplied to the collet from the oil passage blows out towards a tip of a tool only through the jets.

Another object of the present invention is to provide an oil feeding collet chuck wherein axially long radial slits are formed in a collet in order to constrict the collet radially. Cutting oil does not flow to the radial slits but flows out of a tip of a tool through the axial portion of the tool and to provide the collet for the chuck.

In this case, the collet is formed with the above mentioned first and second sets of axially long radial slits and the tool is formed with an axial oil duct, the rear end of which communicates directly with the oil passage. The cutting oil flows out of the front end of this oil duct towards the tip of the tool. Even though the cutting oil leaks from a junction between the oil passage and the oil duct, it is prevented by a zigzag path from flowing out to the outside of the collet and the cutting oil again flows out only from the oil duct after the cutting oil fills completely the second set of slits.

Other objects and advantages of the invention will become apparent in the following discussions in reference with accompanying drawings.

DESCRIPTION OF THE PREFERRED EMBODIMENT

Figure 1:
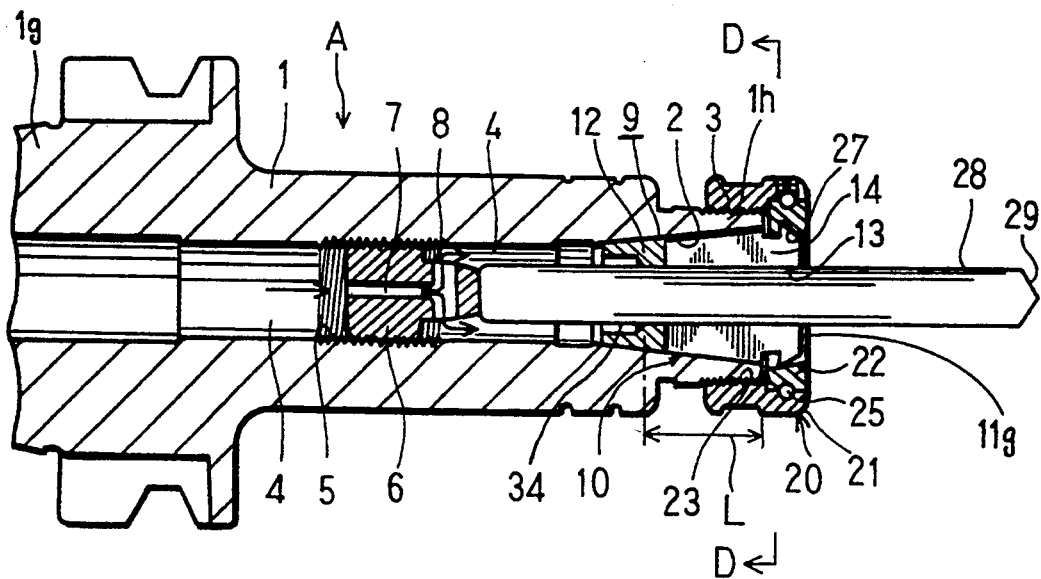
FIG. 1 is a longitudinal section of a collet chuck taken along a line I—I in FIG. 3A for a collet.
Figure 2:
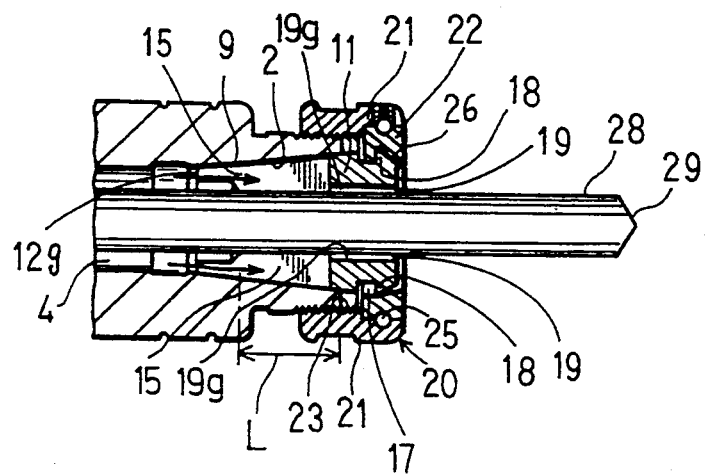
FIG. 2 is a longitudinal section of the collet chuck taken along a line II—II in FIG. 3B for the collet.

With reference to FIGS. 1 through 4C, a base portion 1g of an oil feeding collet chuck A is adapted to be mounted on a well known tool holder or a rotation axis of a machine tool or the like. A main body 1 of the collet chuck A is made in a cylindrical form. A tapered hole 2 is formed in the front end portion 1h and a male screw portion 3 is provided on the outside surface of the end portion 1h. An oil passage 4 is formed as a hollow portion in the main body 1. A female screw 5 is formed on the inside surface of the main body 1 and a positioning member 6 to adjust tile protruding length of a tool 28 is in mesh with the female screw 5. An axial hole 7 for the circulation of cutting oil is formed in the positioning member 6 and communicates with an outlet 8 for the cutting oil.

Figure 3A:
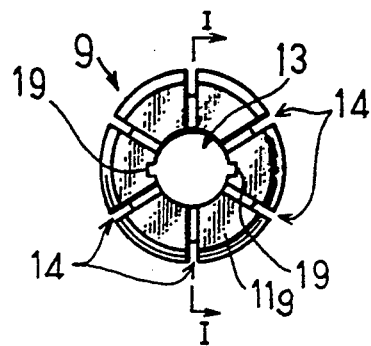
FIGS. 3A, 3B, 3C and 3D are a front end side elevation, a front elevation and a rear end side elevation of the collet and a section taken along a line D—D in FIG. 1, respectively.
Figure 3B:
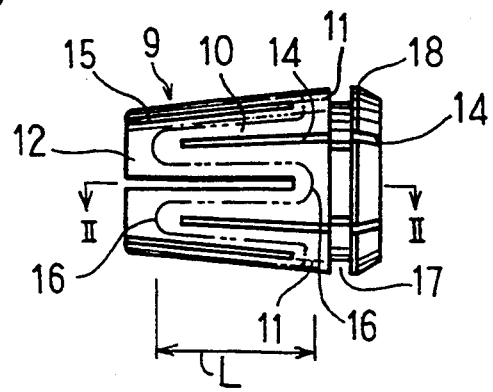
Figure 3C:
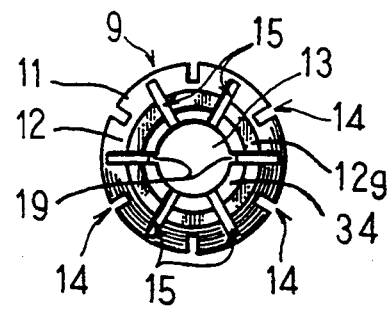
Figure 3D:
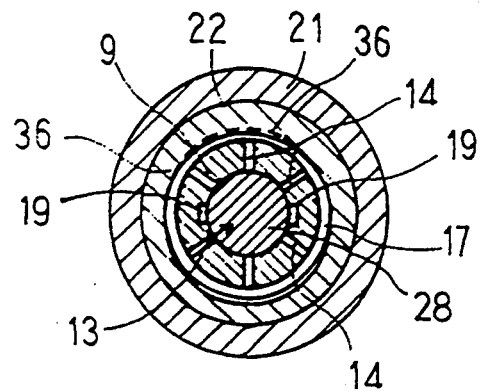

A collet 9 able to feed the cutting oil comprises a main portion 10, an annular front end base portion 11 and an annular rear end base portion 12 and the outside surface of the collet 9 is made in a tapered form closely adaptable in the tapered hole 2. A tool holding hole 13 is formed in the axial portion of the collet 9. A first set of axially long radial slits 14 and a second set of axially long radial slits 15 are formed in the collet 9 for the purpose of making possible the radial constriction of the collet 9. The radial slits 14 of the first set are open at the end surface 11g of the front end base portion 11 and terminate in the rear end base portion 12 and the radial slits 15 of the second set are open at the end surface 12g of the rear end base portion 12 and terminate in the front end base portion 11. The radial slits 14 of the first set and the radial slits 15 of the second set are arranged at suitable angular intervals and alternatively along the peripheral direction of the collet 9. As is seen in FIG. 3B, a part of the outside surface of the base portion 11, that outside surface of the main portion 10 which is not formed with the slits 14 and 15 and a part of the outside surface of the base portion 12 form a zigzag path 16 is closed over the whole periphery of the collet 9. The outside surface of the collet 9 contacts closely the inside surface of the tapered hole 2 along the zigzag path 16. The outside surface of the tool 28 contacts closely with the inside surface of the collet 9, i.e., the inside surface of the tool holding hole 13 along a similar zigzag path. In order to establish the substantial contact at the inside and outside surfaces of the collet 9, the zigzag path 16 in the present embodiment is adapted to span over an axial length L shown in the figure. A groove 17 and a fitting flange 18 contiguous to it are formed on the outside surface of the base portion 11. This groove 17 and fitting flange 18 form an engage portion to be described later. One or more of thin jets 19 communicate with the radial slits 15 through a passage 19g formed in the base portion 11. The Jets 19 may communicate with the oil passage 4 through a path provided independently of the slits 15. The cross-sectional area of the Jet 19 is made so small that the cutting oil can reach a tip 29 of the tool 28 with a sufficient axial speed in spite of the centrifugal force due to high speed rotation of the chuck A.

In the next place, a well known cylindrical clamp member 20 to press the collet 9 into the tapered hole 2 comprises a cylindrical main body 21 and an engage member 22 connected to it. The main body 21 is formed, on the inside surface thereof, with a female screw portion 23 adapted to be in mesh with the male screw portion 3. The engage member 22 is formed, on the inside surface thereof, with a fitting groove 24 adapted to engage the fitting flange 18 and is connected, at the outside surface thereof, to the main body 21 by a ball 25 so that the main body 21 may rotate relative to the engage member 22 but move axially together with it.

Figure 4A:
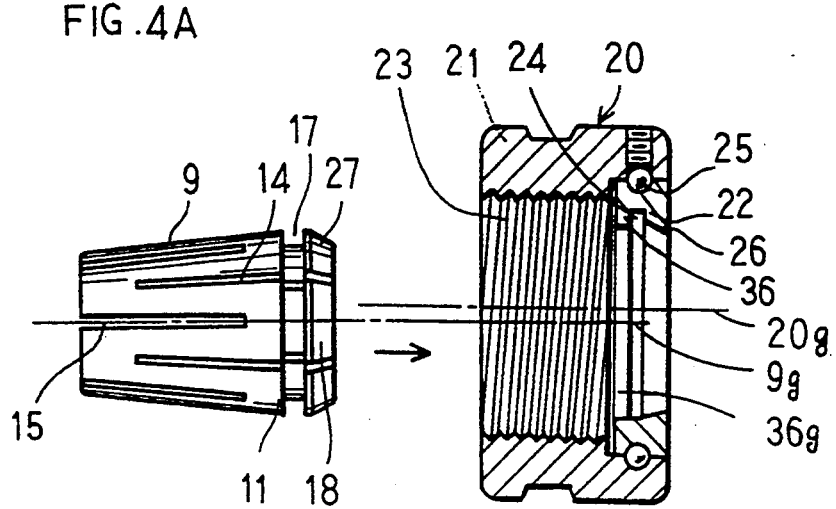
FIGS. 4A, 4B and 4C are views in partial section showing the assembling procedure of the collet.
Figure 4B:
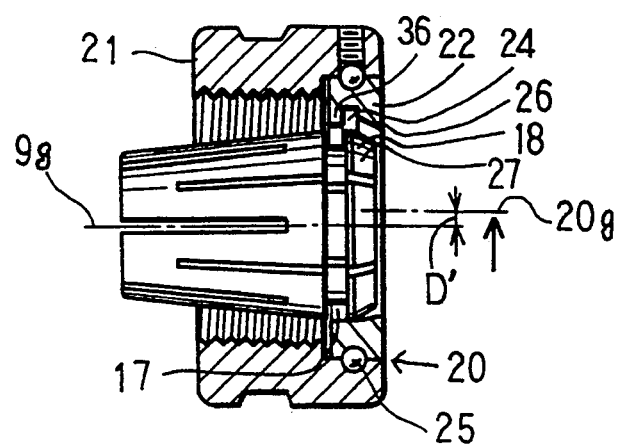
Figure 4C:
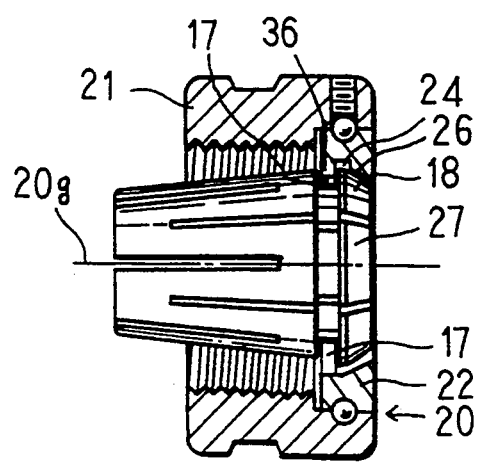

The collet chuck A as constructed above is assembled in the following well known procedure. As shown in FIG. 4A, the collet 9 is inserted into a hollow portion 36g in the clamp member 20 located off the axis 9g of the collet 9 from the front end base portion 11 of the collet 9 along the axis 9g of the collet 9 not coaxial with the axis 20g of the clamp member 20. As shown in FIG. 4B, when the collet 9 is inserted in the clamp member 20 without being obstructed by a projection 36 contiguous to the fitting groove 24, owing to an eccentric distance D′, a part of an annular conical outside surface 27 in the front end base portion 11 of the collet 9 abuts on a part of a conical inside surface 26 of the engage member 22 coaxial with the axis 20g. When the collet 9 is inserted further into the clamp member 20, the conical side surfaces 26 and 27 contact each other completely, the collet 9 becomes automatically coaxial with the clamp member 20, the projection 36 fits in the groove 17 and the fitting flange 18 fits in the fitting groove 24 as shown in FIG. 4C. The collet 9 and the clamp member 20 are united at their coaxial position in this manner. Next the positioning member 6 is secured at a predetermined position in the oil passage 4 in the chuck A. The tool 28 is inserted in the tool holding hole 13 of the collet 9 united with the clamp member 20 and the rear end of the tool 28 is caused to abut on the positioning member 6. Then the cylindrical main body 21 of the clamp member 20 is rotated and the collet 9 is pressed into the tapered hole 2. As the collet 9 with the tapered outside surface is pressed in the tapered hole 2, a radial force acts on the collet 9 and it contracts radially owing to the presence of the axially long radial slits 14 and 15. As a result, the inside surface of the collet 9 binds the tool 28 tight and allows the tool 28 to rotate together with the chuck A in spite of a reaction force exerted by a work piece on the tool 28.

The main body 1 of the chuck A assembled in the above mentioned manner is rotated and the chip 29 of the tool 28 rotating with the chuck A performs a well known machining process such as boring. In this case, the cutting oil supplied at a constant flow rate reaches the Jets 19 through the oil passage 4, the axial hole 7, the outlet 8 and the radial slits 15 and flows out of the Jets 19 forcibly with a sufficient axial speed to the chip 29 and the work piece. This cutting oil cools the chip 29 effectively and simultaneously gives satisfactory lubrication between the chip 29 and the work piece. Since the outside and inside surfaces of the collet 9 contact closely with the inside surface of the tapered hole 2 and the outside surface of the tool 28, respectively along the aforementioned respective zigzag paths 16, the cutting oil does not leak along the outside and inside surfaces of the collet 9 but flows out of the Jets 19 alone. Accordingly, the axial speed of the cutting oil of the constant flow rate is determined only by the cross-sectional area of the Jet 19 and can be adjusted to a desired value.

Figure 5:
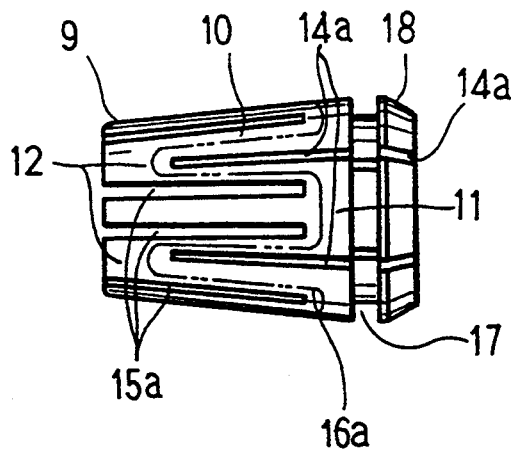
FIG. 5 is a front elevation of a different collet.

In the next place, a different embodiment of the collet is explained in reference with FIG. 5. In this embodiment, a first slit group including a single radial slit 14a and a second slit group including two radial slits 15a are arranged alternating and a zigzag path 16a is formed similarly as in the previous embodiment. The number of the slits 14a and 15a included in these slit groups is arbitrary so long as a collet 9a can be subject to appropriate radial constriction.

Figure 6:
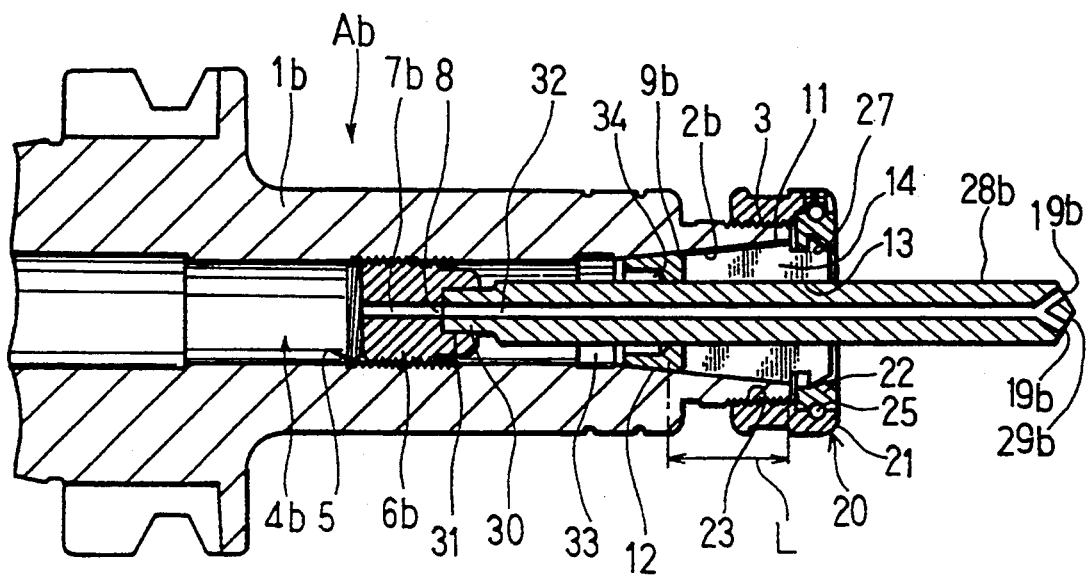
FIG. 6 is a longitudinal section of the different collet taken along a plane including a first set of radial slits.
Figure 7:
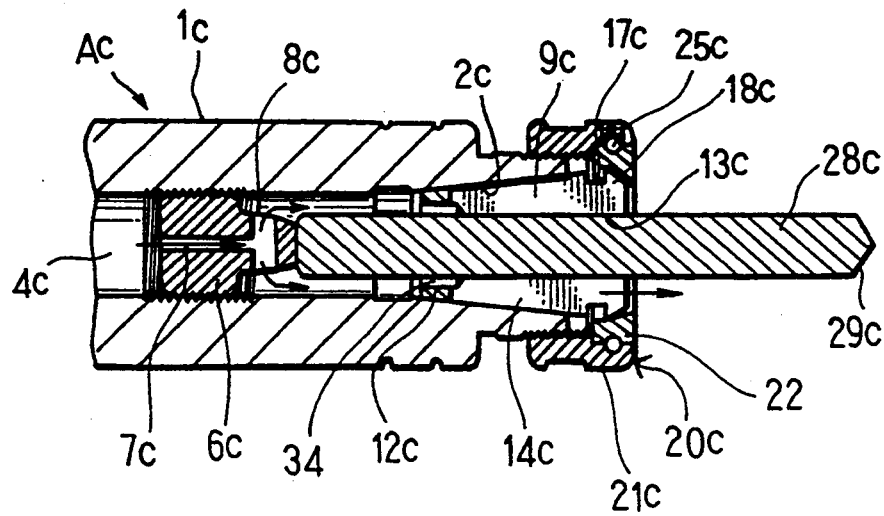
FIG. 7 is a longitudinal section of a conventional collet chuck.
Figure 8:
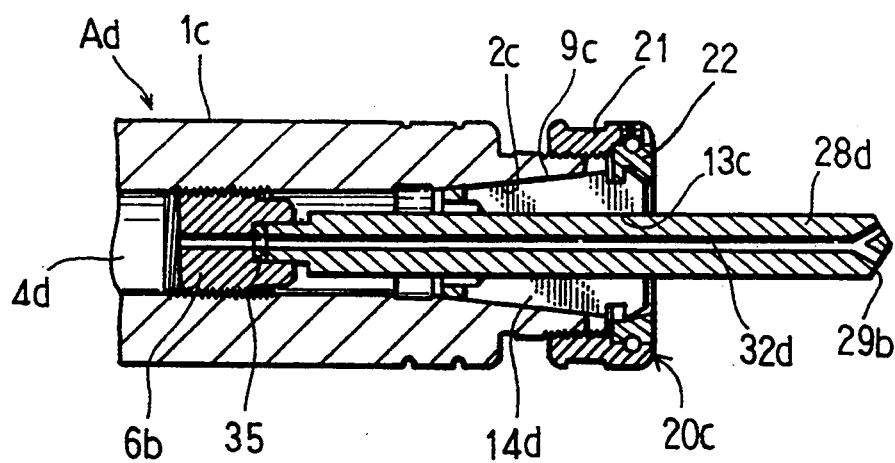
FIG. 8 is a longitudinal section of a different conventional collet chuck.

In the next place, an embodiment including a different tool 28b is explained in reference with FIG. 6. In the front end of a positioning member 6b is formed a depression 31 to receive a connecting projection 30 formed as the rear end of the tool 28b and communicates with an axial hole 7b formed in the front end of the positioning member 6b. An oil duct 32 is formed along the whole length of the axis of the tool 28b and has a plurality of open ends 19b branching off at a chip 29b.

This chuck Ab is assembled in the same manner as the chuck Aa in the previous embodiment and an axial hole 7b communicates with the oil duct 32. A main body 1b of the chuck Ab is rotated and the cutting oil supplied at a constant flow rate flows out of the branching jets 19b forcibly with a sufficient axial speed through an oil passage 4b, the axial hole 7b and the oil duct 32. Also in this case, the outside and inside surfaces of a collet 9b contact closely with the inside surface of a tapered hole 2b and the outside surface of the tool 28b, respectively along zigzag paths similar to those aforementioned. Accordingly, even if the cutting oil leaks through the junction between the axial hole 7b and the oil duct 32, this oil just fills a space 33 between the main body 1b and the tool 28b and the slits 15b of the second set (not shown) but does not flows out of the chuck Ab along the inside and outside surfaces of the collet 9b.

As many apparently widely different embodiments of this invention may be made without departing from the spirit and scope thereof, it is to be understood that the invention is not limited to the specific embodiments thereof except as defined in the appended claims

What is claimed is:

1. An oil feeding collet chuck comprising:
   (a) a main body having a front end portion and a tapered hole formed in said front end portion;
   (b) an oil passage communicating with said tapered hole,
   (c) a collet having an axis, outside and inside surfaces, a tapered outside surface closely adaptable in said tapered hole, a tool holding hole formed along said axis of said collet and an engage portion;
   (d) a clamp member to press said collet into said tapered hole, said engage portion connectable to said clamp member;
   (e) jets communicating with said oil passage to make cutting oil flow out toward the front end of said tool; and
   (f) a tool fitted in said tool holding hole;
   (g) said collet being formed with:
      (i) a front end base portion, a main portion and a rear end base portion all together forming a substantial portion of said collet;
      (ii) a first set of axially long radial slits opening at the end surface of said front end base portion and terminating in said rear end base portion; and
      (iii) a second set of axially long radial slits opening at the end surface of said rear end base portion and terminating in said front end base portion, each of the radial slits of said first set and each of said radial slits of said second set being arranged at proper angular intervals and alternately along the peripheral direction of said collet, respective zigzag paths being formed which are closed over the entire periphery of the outside and inside surfaces of said collet, respectively, said outside and inside surfaces of said collet contacting closely the inside peripheral surface of said tapered hole and the outside peripheral surface of said tool, respectively along said respective zigzag paths, said collet being contractible radially responsive to the slits of said two sets and said cutting oil supplied to said oil passage adapted to flow out of said collet through said jets toward said tool.

2. An oil feeding collet chuck as set forth in claim 1 wherein said jets communicate with said oil passage through said slits of said second set formed in said front end base portion.

3. An oil feeding collet chuck as set forth in claim 1 wherein a first slit group including one or more of the radial slits of said first set and a second slit group including one or more of the radial slits of said second set are arranged alternately and form similar zigzag paths on said outside and inside surfaces of said collet.

4. An oil feeding collet chuck as set forth in claim 1 further including an oil duct opening at the front end of the tool and communicating with said oil passage along the axis of said tool, said oil duct adapted to function as said jets.

5. An oil feeding collet chuck as set forth in claim 1 wherein said engage portion in said front end base portion includes a fitting flange integral with the outside surface of said front end base portion and a groove contiguous with said fitting flange, said clasp member including a cylindrical main body in mesh with said main body in said chuck and an engage member rotatable relative to said cylindrical main body and movable axially together with said cylindrical main body, said fitting flange disposable in a fitting groove formed in said engage member.

6. An oil feeding collet chuck as set forth in claim 4 wherein said oil duct includes branching open ends.

7. An oil feeding collet having an axis, a collet chuck having a tapered hole in a clamp member, comprising:
   (a) a front end base portion having an engage portion connectable to said clamp member in said collet chuck, a main portion, and a rear end base portion, said two base portions and said main portion forming a substantial portion in said collet, said collet having a tapered outside surface closely adaptable in said tapered hole in said collet chuck,
   (b) a tool holding hole formed along said axis of said collet,
   (c) a first set of axially long radial slits opening at the end surface of said front end base portion and terminating in said rear end base portion,
   (d) a second set of axially long radial slits opening at the end surface of said rear end base portion and terminating in said front end base portion,
   (e) each of the radial slits of said first set and each of said radial slits of said second set being arranged at proper angular intervals and alternately along the peripheral direction of the collet, respective zigzag paths being formed which are closed over the whole periphery of the outside and inside surfaces of said collet, respectively,
   (f) said collet being contractible radially responsive to the radial slits of said two sets to prevent cutting oil from flowing along the outside and inside surfaces of said collet.

8. An oil feeding collet as set forth in claim 7 further including jets opening at the end surface of said front end base portion in said front end base portion communicating with the slits of said second set.

9. An oil feeding collet as set forth in claim 7 wherein said engage portion includes a fitting flange integral with the outside surface of said front end base portion and a groove contiguous to said fitting flange.

10. An oil feeding collet as set forth in claim 7 wherein a first slit group including one or more of the radial slits of said first set and a second slit group including one or more of the radial slits of said second set are arranged alternately and similar zigzag paths are formed on said outside and inside surfaces of said collet.

* * * * *